(12) United States Patent
Greiner et al.

(10) Patent No.: US 7,761,723 B2
(45) Date of Patent: Jul. 20, 2010

(54) PROCESSOR TEMPERATURE CONTROL INTERFACE

(75) Inventors: Robert J. Greiner, Beaverton, OR (US); Benson D. Inkley, North Plains, OR (US); Nathan C. Schultz, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 341 days.

(21) Appl. No.: 11/203,004

(22) Filed: Aug. 11, 2005

(65) Prior Publication Data

US 2005/0273634 A1    Dec. 8, 2005

Related U.S. Application Data

(63) Continuation of application No. 10/099,648, filed on Mar. 15, 2002, now Pat. No. 6,957,352.

(51) Int. Cl.
*G06F 1/00* (2006.01)

(52) U.S. Cl. .................. 713/310; 713/300; 713/320; 713/322

(58) Field of Classification Search ............. 713/300, 713/310, 320, 322
See application file for complete search history.

(56) References Cited

U.S. PATENT DOCUMENTS

| | | | |
|---|---|---|---|
| 5,490,059 A | | 2/1996 | Mahalingaiah et al. |
| 5,502,838 A | | 3/1996 | Kikinis |
| 5,719,800 A | | 2/1998 | Mittal et al. |
| 5,870,614 A | * | 2/1999 | Ang .......................... 713/320 |
| 5,974,557 A | * | 10/1999 | Thomas et al. .............. 713/322 |
| 6,119,241 A | * | 9/2000 | Michail et al. .............. 713/322 |
| 6,172,611 B1 | * | 1/2001 | Hussain et al. .............. 340/584 |
| 6,363,490 B1 | | 3/2002 | Senyk |
| 6,415,388 B1 | * | 7/2002 | Browning et al. ........... 713/322 |
| 6,427,211 B2 | * | 7/2002 | Watts, Jr. .................... 713/320 |
| 6,442,700 B1 | * | 8/2002 | Cooper ....................... 713/320 |
| 6,487,668 B2 | | 11/2002 | Thomas et al. |
| 6,718,474 B1 | * | 4/2004 | Somers et al. .............. 713/322 |
| 6,751,282 B1 | | 6/2004 | Kramer et al. |
| 6,774,653 B2 | * | 8/2004 | Gold et al. .................. 324/760 |
| 6,893,154 B2 | * | 5/2005 | Gold et al. .................. 374/170 |
| 6,908,227 B2 | * | 6/2005 | Rusu et al. .................. 374/141 |
| 6,957,352 B2 | * | 10/2005 | Greiner et al. .............. 713/300 |
| 6,996,491 B2 | * | 2/2006 | Gold et al. .................. 702/132 |
| 7,017,062 B2 | * | 3/2006 | Poisner ....................... 713/340 |
| 7,036,030 B1 | * | 4/2006 | Altmejd ...................... 713/322 |
| 7,062,665 B2 | * | 6/2006 | Zhang et al. ................ 713/322 |
| 7,262,624 B2 | * | 8/2007 | Miller ......................... 324/765 |
| 2001/0003207 A1 | | 6/2001 | Kling et al. |
| 2004/0025061 A1 | * | 2/2004 | Lawrence ................... 713/300 |

OTHER PUBLICATIONS

International Search Report; International Application No. PCT/US03/06864; mailed Jun. 15, 2004, 2 pages.
International Preliminary Examination Report; International Application No. PCT/US03/06864; mailed Aug. 20, 2003, 3 pages.

* cited by examiner

*Primary Examiner*—Thomas Lee
*Assistant Examiner*—Jaweed A Abbaszadeh
(74) *Attorney, Agent, or Firm*—David L. Guglielmi

(57) ABSTRACT

Techniques for a processor temperature control interface. In one embodiment, a processor includes a bidirectional interface and output logic to assert a first signal indicating an internal high temperature on the bidirectional interface. Throttling logic throttles operations of the processor if either the internal high temperature is indicated or if an external signal is received on the bidirectional interface.

17 Claims, 4 Drawing Sheets

PROCESSOR TEMPERATURE CONTROL INTERFACE

CROSS-REFERENCE TO RELATED APPLICATIONS

The present application is a continuation application of and claims the priority date of U.S. patent application Ser. No. 10/099,648 now U.S. Pat. No. 6,957,352 entitled "PROCESSOR TEMPERATURE CONTROL INTERFACE," filed Mar. 15, 2002 and assigned to the assignee of the present invention.

BACKGROUND

1. Field

The present disclosure pertains to the field of electronic components. More particularly, the present disclosure pertains to a temperature control interface for an electronic component such as a processor.

2. Description of Related Art

Controlling the temperature of electronic components is an ongoing struggle as components continue to shrink, yet often consume more power. Microprocessors now employ sophisticated techniques to allow power conservation and to throttle themselves when temperatures reach certain thermal metrics.

For example, one prior art processor includes a stop clock pin that allows the system to stop the processor clock for various reasons. One known use of this pin is to provide a periodic waveform on the stop clock pin, causing the processor to periodically stop and re-start processor (see, e.g., U.S. Pat. No. 5,560,001). Such clock throttling effectively reduces the processor operating rate, thereby typically reducing power consumption and temperature.

Additionally, the prior art processor may itself have thermal sensors and may perform its own internally-initiated throttling. When internally-initiated throttling for thermal reasons is employed, an external signal may be asserted to alert the system (see, e.g., PROCHOT# output signal of the Pentium® 4 Processor).

These mechanisms, however, may not provide adequate control and/or synchronization capabilities for some applications.

BRIEF DESCRIPTION OF THE FIGURES

The present invention is illustrated by way of example and not limitation in the Figures of the accompanying drawings.

DETAILED DESCRIPTION

The following description describes techniques for a processor temperature control interface. In the following description, numerous specific details such as logic implementations, clocks, signal names, types and interrelationships of system components, and logic partitioning/integration choices are set forth in order to provide a more thorough understanding of the present invention. It will be appreciated, however, by one skilled in the art that the invention may be practiced without such specific details. In other instances, control structures, and gate level circuits have not been shown in detail in order not to obscure the invention.

In one embodiment, a bidirectional processor hot (PROCHOT#) interface is provided to allow both system observation and system control of a processor's thermal state. Such a bidirectional interface may be useful, for example, in desktop and mobile systems where a limited amount of control and observation capabilities are to be balanced with the use of additional pins. In another embodiment, a two pin PROCHOT# and force processor hot (FORCEPH#) interface allows the system to both observe and control assertion of a throttling mechanism.

A "processor" may be formed as a single integrated circuit in some embodiments. In other embodiments, multiple integrated circuits may together form a processor, and in yet other embodiments, hardware and software routines (e.g., binary translation routines) may together form the processor. Many different types of integrated circuits and other electronic components could benefit from the use of such temperature control techniques. For example, the processor 100 may be a general purpose processor (e.g., a microprocessor) or may be a special purpose processor or device. For example, digital signal processors, graphics processors, network processors, or any type of special purpose component that may be used in a system may benefit from system visible and controllable throttling.

Figure 1:
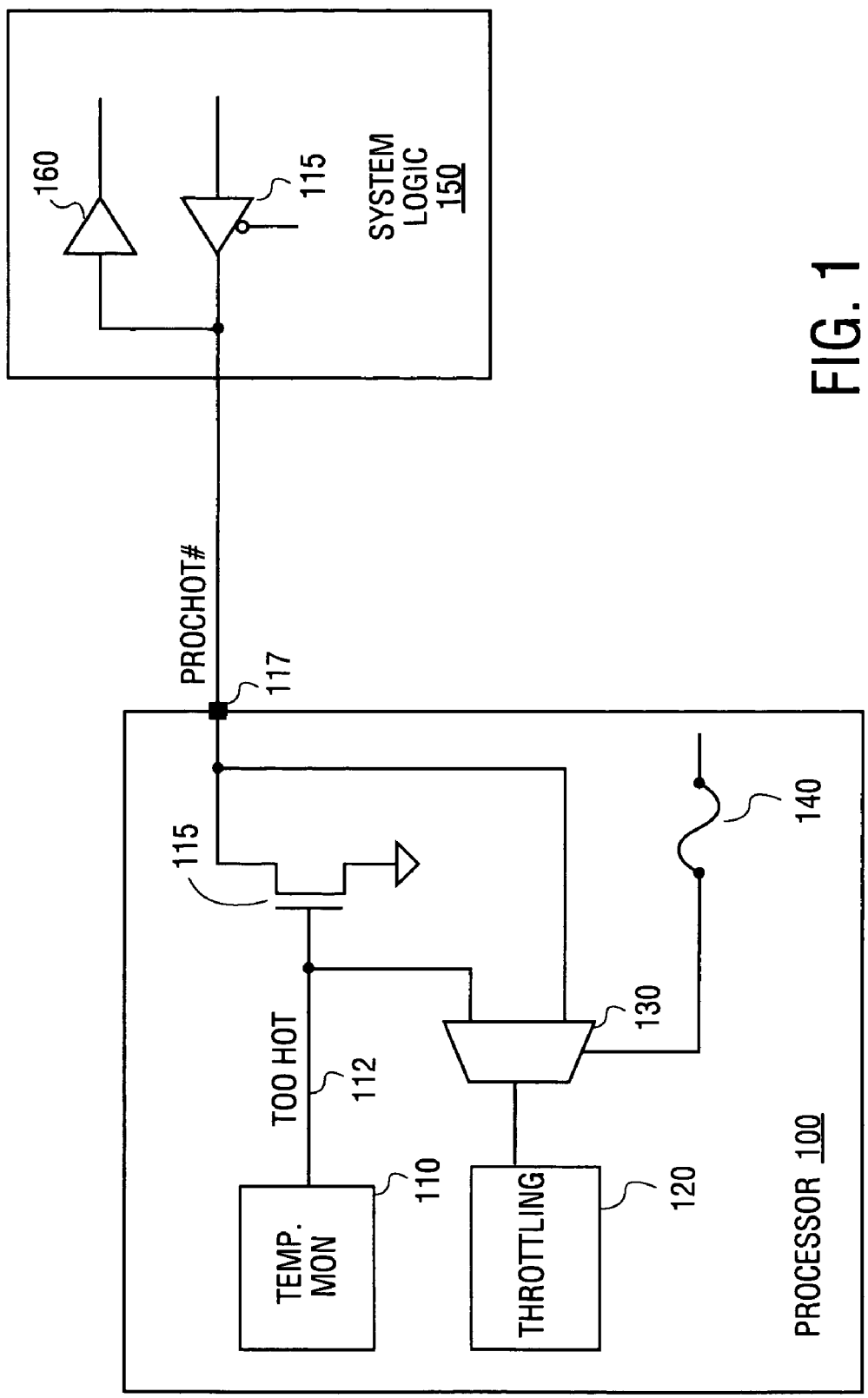
FIG. 1 illustrates one embodiment of a system having a bidirectional processor hot interface.

FIG. 1 illustrates one embodiment of a processor 100 having a bidirectional processor hot interface (PROCHOT# interface node 117). The interface may be a pin, ball, or any other type of connector or set thereof that can provide at least one interface node to interface to other components. The processor 100 includes temperature monitoring logic 110 which monitors the temperature of the processor itself. A variety of known or otherwise available temperature monitoring techniques may be used. For example, a built in circuit that monitors temperature may be used. Alternatively, external sensors may be used or power consumption estimation techniques (e.g., activity counters/monitors, current monitors, etc). The temperature monitor 110 is coupled to an output driver 115 which drives the interface node 117 via a signal line 112 for a TOO HOT signal. The TOO HOT signal is also routed to throttling logic 120 through a multiplexer 130. The multiplexer is controlled by a fuse 140, which selects between unidirectional and bidirectional modes of operation in the illustrated embodiment.

In the embodiment of FIG. 1, system logic 150 interfaces with the processor 100 and may drive via a driver 155 or receive via an input buffer 160 the PROCHOT# signal. The system logic may itself include some thermal sensors to determine when the overall system has reached an unacceptable temperature level, and may accordingly drive the PROCHOT# signal.

Figure 2:
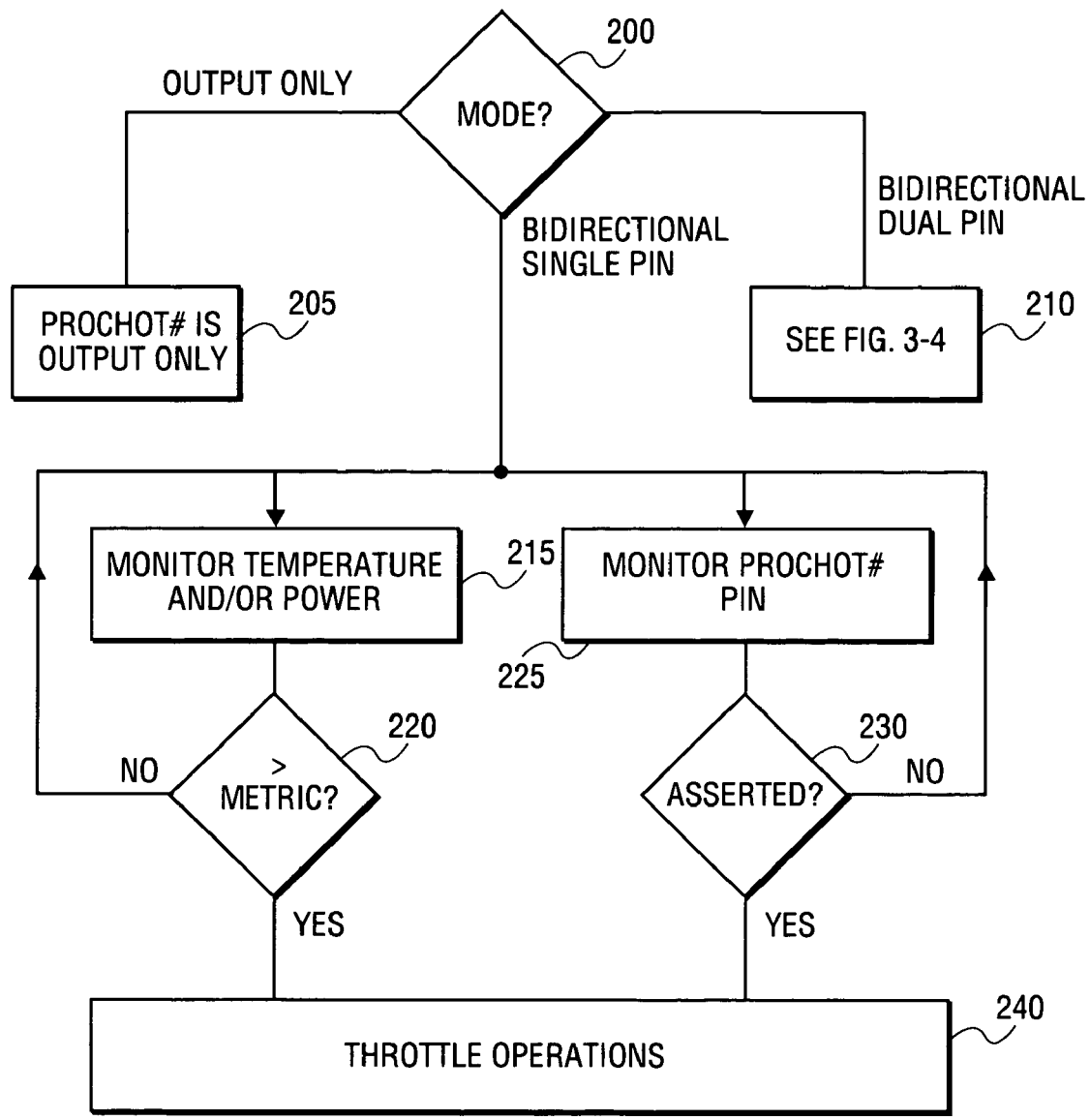
FIG. 2 is a flow diagram illustrating operations of the system shown in FIG. 1 according to one embodiment.

Operations for one embodiment of the system of FIG. 1 are shown in FIG. 2. In block 200, the different modes of operation are separated out. In some embodiments, semiconductor fuses may be blown to select the mode of operations. Other selection techniques such as configuration registers and the like may also be used to select the mode of operation. In an output only mode, the fuse 140 causes the multiplexer 130 to select TOO HOT as the input to the throttling logic 120. Thus, the external state of the PROCHOT# signal is not considered, making PROCHOT# effectively output only as indicated in block 205.

In a bidirectional, single pin mode, both the system logic 150 and the processor 100 can drive PROCHOT# to control throttling. As indicated in blocks 215 and 225 the processor 100 monitors its temperature and monitors the PROCHOT# interface. If the temperature does not exceed a selected metric, then the processor continues monitoring the temperature, as indicated in block 220. Similarly, if the PROCHOT# signal is not asserted, the processor 100 will continue to monitor the interface as indicated in block 230. If either the PROCHOT# signal is asserted or the temperature exceeds the selected metric, then processor operations are throttled by throttling logic 120 as indicated in block 240.

The throttling performed by the throttling logic may be any appropriate known or otherwise available throttling technique. For example, the clock to the device may be periodically stopped. Alternatively, the processing throughput may be reduced by limiting throughput at some stage of the pipeline. Alternatively, the clock frequency may be changed. These or any other techniques that effectively reduce the amount of processing by the processor may be used by the throttling logic.

Figure 3:
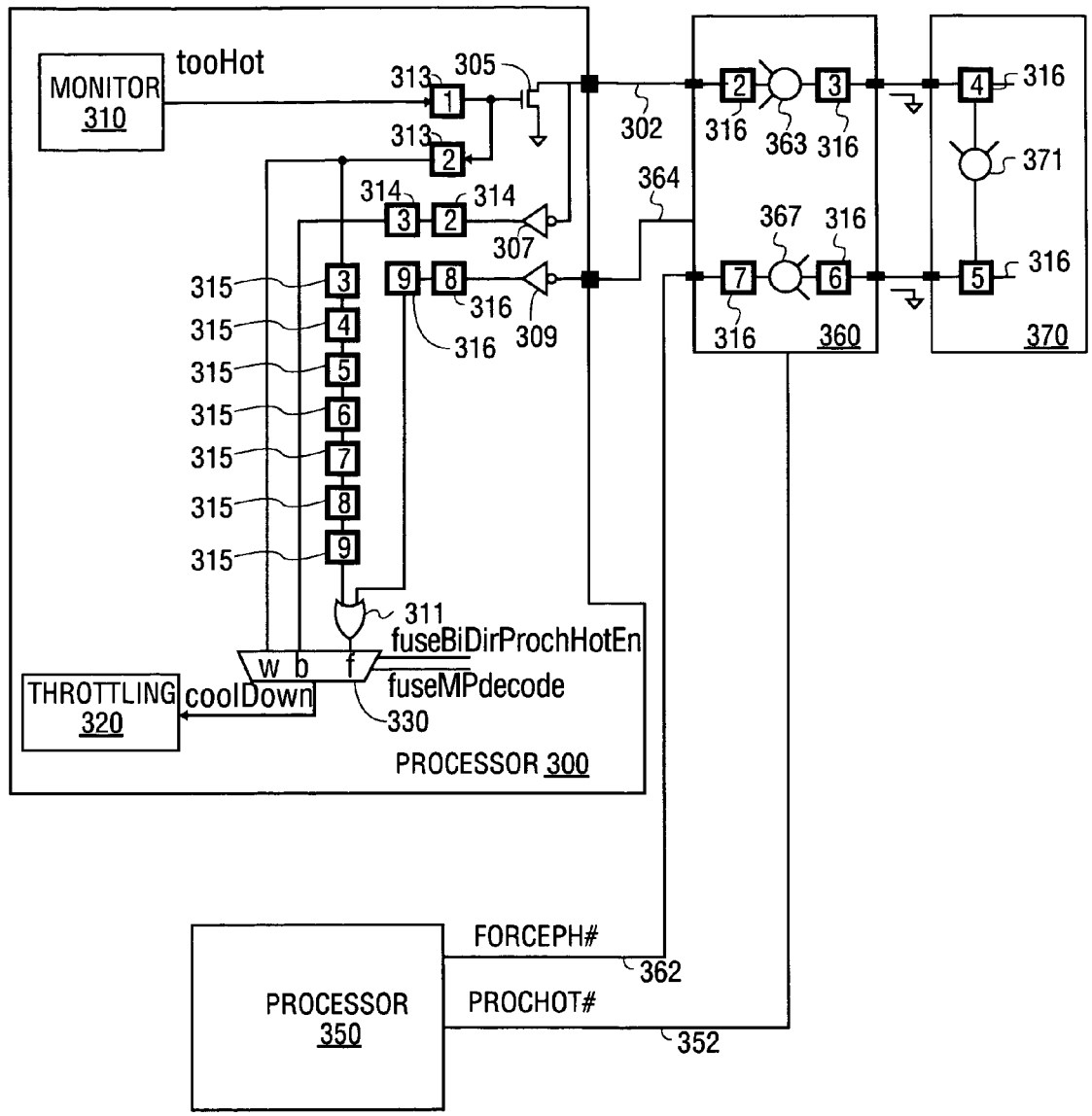
FIG. 3 illustrates one embodiment of a multi-processor system utilizing a processor hot interface.
Figure 4:
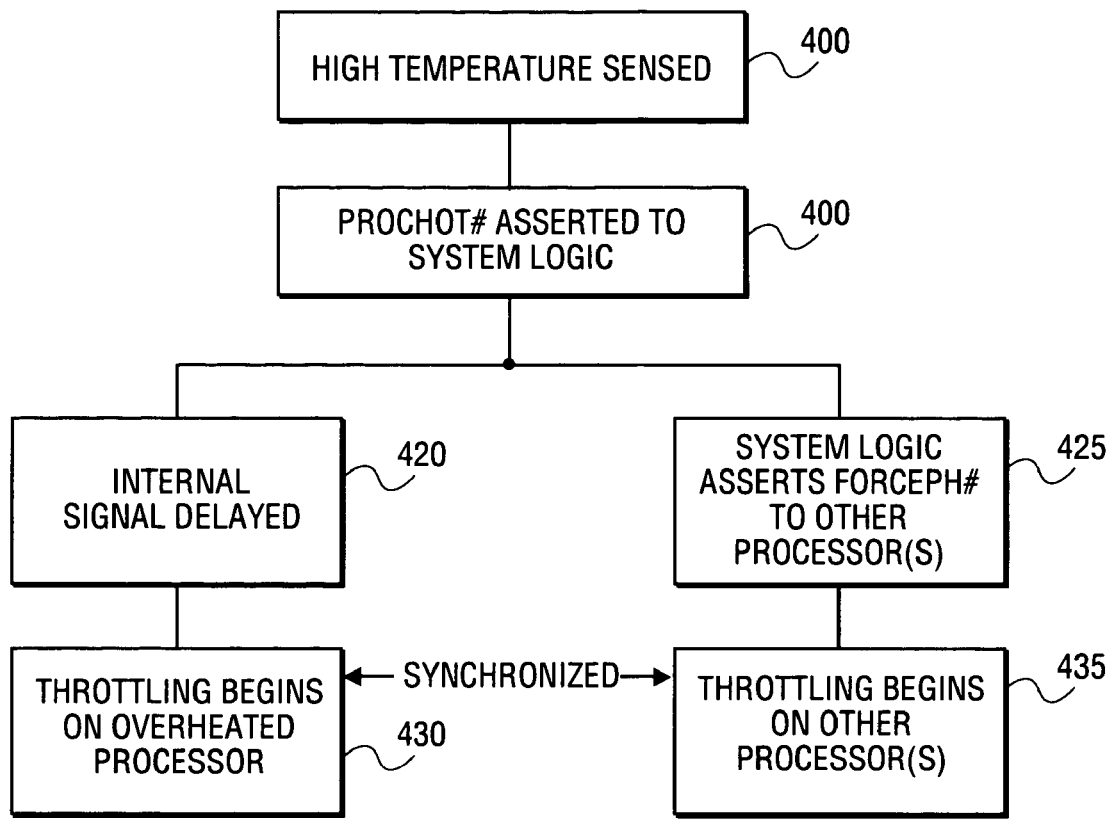
FIG. 4 is a flow diagram illustrating operations of the system shown in FIG. 3 according to one embodiment.

In a third mode, a bidirectional, dual pin PROCHOT# implementation may be used, as indicated in block 210. FIGS. 3 and 4 provide further details of one embodiment using a dual pin implementation. A dual pin implementation may allow both observation of the processor's internal gauge of temperature and assertion of a throttling command. With a single pin, asserting the throttle command would mask the processor's assertion of the same pin. In the embodiment of FIG. 3, two processors are shown for illustrative purposes, but additional processors could be added. The processor 300 and the processor 350 both have FORCEPH# and PROCHOT# pins. Signal lines 364 and 362 respectively couple the FORCEPH# signals driven by the system logic to processors 300 and 350, and signal lines 302 and 352 respectively carry the PROCHOT# signals driven by the processors 300 and 350 to the system logic.

The processor 300 includes a monitor 310 to detect when the processor 300 is too hot (or in some embodiments when too much power is being consumed). Each numbered block represents a delay element such as a latch. A driver 305 is coupled to receive a TOO HOT signal from the monitor 310 and to drive a PROCHOT# signal on a signal line 302. A first path to a multiplexer 330 takes the TOO HOT signal through delay block 313-1 and delay block 313-2 and to a "w" input of the multiplexer 330. A second path to the multiplexer 330 takes the TOO HOT signal through the delay block 313-1, past the output driver 305 (also therefore picking up any externally asserted signals on signal line 302), through an inverting driver 307, and through delay blocks 314-2 and 314-3 to a "b" input of the multiplexer 330.

A third path to the multiplexer includes inputs from both signal line 302 (PROCHOT#) and from a signal line 364, which is driven by system logic 360. The signal line 364 may be a force processor hot (FORCEPH#) signal line which allows external considerations to be used to determine when to throttle operations. In one embodiment, a system may wish to begin throttling of multiple processors simultaneously (i.e., during the same clock cycle of the external bus clock), even if both processors would not have simultaneously throttled themselves. In this embodiment, it may be desirable to match delays of the TOO HOT signal to the throttling logic 320 to the delay expected through the path of the system logic. For example, in the embodiment of FIG. 3, the TOO HOT signal passes through delay block 313-1, the output driver 305, through delay block 316-2, combinational logic 363, delay block 316-3, into system logic 370, through delay block 316-4, combinational logic 371, delay block 316-5, back to system logic 360, through delay block 316-6, combinational logic 367, delay block 316-7, and then into a second processor 350.

Assuming the second processor to have identical logic to that shown for processor 300, the path continues through elements corresponding to an input buffer 309, two more delay blocks 316-8 and 316-9, an OR gate 311, and an "f" input of the multiplexer 330.

Similarly, the path of the TOO HOT signal internal to the processor 300 includes 9 delay blocks and the OR gate 311. Internally, in the dual pin mode, the TOO HOT signal passes through delay blocks 313-1 and 313-2, and then through delay blocks 315-3 through 315-9, and into OR gate 311. The OR gate provides the multiplexer 330 with an indication that throttling should be performed if either the system logic 360 and 370 assert FORCEPH# on signal line 364 or if the monitor 310 indicates that throttling should be performed. The system logic components 360 and 370 may be local (360) and global 370) control application specific integrated circuits (ASICs). Whether any or all of the logic is separate or integral is not, however, crucial to the disclosed techniques. Logic may be included in the processors themselves, in other system components such as bus bridges, or in ASICs or the like. Additionally, the absolute number or length of the various delays is not crucial; however, providing delay matching is desirable for some embodiments.

In the embodiment of FIG. 3, the two control inputs to the multiplexer (fuseBiDirProcHotEn and fuseMPdecode) control which mode is selected. If the fuseMPdecode fuse indicates that the multiprocessor (dual pin) PROCHOT#/FORCEPH# implementation is desired, then path "f" to the multiplexer is selected. If the fuse fuseBiDirProcHotEn indicates that the bidirectional mode only is desired, then the input "b" of the multiplexer is selected. If the fuses indicate that neither the bidirectional nor the multiprocessor (dual pin) mode is desired, then the output-only mode is used, and path "w" to the multiplexer is selected.

FIG. 4 illustrates operations for a multiprocessor system in which the dual pin mode is selected (e.g., path "f" on the multiplexer 330 of the embodiment of FIG. 3). In block 400, a high temperature is sensed (e.g., by monitor 310). In block 410, the PROCHOT# signal is asserted to the system logic. As indicated in block 420, the internal TOO HOT signal is delayed. In the embodiment of FIG. 3, the path through delays 313-1, 313-2, and 315-3 through 315-9 provides delays. As indicated in block 425, the asserted PROCHOT# signal also propagates through the system logic, incurring delays, and results in generation of the FORCEPH# signal to other processor(s) in the system. For example, in the embodiment of FIG. 3, the FORCEPH# signal may be asserted to the processor 350 on the signal line 362.

Due to the delay within the first processor, which is designed to match the delay in the path through the system logic in addition to any internal delays, the processors begin throttling in synchronization as shown in blocks 430 and 435. It may be desirable in some systems to have such synchronization of throttling to keep processors operating at a uniform rate, thereby roughly equalizing progress and thermal/power concerns. Accordingly, a processor may be forced into a throttling state even where that processor would not have otherwise entered the throttling state.

Thus, techniques for a processor temperature control interface are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A processor comprising:
a bidirectional interface;
output logic to assert a first signal indicating an internal high temperature on said bidirectional interface;
throttling logic coupled to said bidirectional interface, said throttling logic to throttle operations of said processor if either said internal high temperature is indicated by said first signal or if an external signal is received on said bidirectional interface, wherein said internal high temperature is indicated by a signal transmitted on the bidirectional interface to indicate whether the internal high temperature has reached an unacceptable level, and further comprising an external high temperature is indicated by a signal from a second processor indicating whether the second processor's internal high temperature has reached an unacceptable level.

2. The processor of claim 1 wherein said bidirectional interface is a single interface node.

3. The processor of claim 1 further comprising:
a first path for said first signal;
a second path for said external signal;
selection logic to select between said first path which disregards the external signal in a unidirectional mode and said second path which considers said external signal in a bidirectional single interface mode.

4. The processor of claim 3 wherein said bidirectional interface comprises a first interface node and a second interface node, the second interface node being an input, the selection logic to further select a third path in a bidirectional dual interface mode.

5. The processor of claim 4 wherein said third path comprises:
an internal signal path for said first signal having a first delay;
an external signal path for said external signal having a second delay, said first delay to match the second delay plus an external delay.

6. The processor of claim 1 wherein said bidirectional interface further comprises: a single bidirectional interface node when a bidirectional mode is enabled.

7. The processor of claim 6 further comprising:
a first delay in a first path of said first signal;
a second delay in a second path of said external signal, wherein said first delay in said first path matches said second delay in said second path plus an external delay.

8. A system comprising:
a first processor comprising:
a bidirectional interface;
throttling logic to throttle said first processor in response to the internal signal or the external signal, wherein said internal signal indicates whether an internal temperature has reached an unacceptable level, and wherein the internal signal is transmitted on the bidirectional interface;
system logic to assert said external signal; and
a second processor comprising:
a second processor first interface node to output a second processor internal signal indicating a second processor high temperature;
a second processor second interface node to receive a second external signal;
second processor throttling logic to throttle said second processor in response to the second processor internal signal or the second external signal;
wherein said system logic is to assert said external signal to said first processor in response said second processor outputting said second processor internal signal indicating whether said second processor high temperature has reached an unacceptable level.

9. The system of claim 8 wherein said first processor further comprises:
a first delay in a first path of said internal signal to said throttling logic;
a second delay in a second path of said external signal to said throttling logic, said first delay to match said second delay plus a system logic delay.

10. The system of claim 9 wherein said first processor and said second processor are to commence throttling in synchroniiation in response to said second processor internal signal.

11. The system of claim 10 wherein said first processor and said second processor are to commence throttling in a same single clock cycle.

12. A method comprising:
driving a first signal to a first processor indicating an internally measured high temperature of a second processor on a bidirectional interface;
throttling operations by the first processor if either said first signal is driven or if an external signal is received on said bidirectional interface, wherein the internal high temperature of the second processor is indicated by a signal to indicate whether the internal high temperature of the second processor has reached an unacceptable level.

13. The method of claim 12 wherein driving comprises:
testing if a selected thermal metric is reached;
driving the first signal if said selected thermal metric is reached.

14. The method of claim 12 wherein said interface node is a single bidirectional interface node.

15. The method of claim 12 further comprising delaying the first signal and the external signal through different delay paths.

16. The method of claim 12 further comprising selecting either a first mode using a single bidirectional interface node as the interface node or a second mode using two interface nodes.

17. The method of claim 16 further comprising:
delaying, in the second mode, the first signal to cause throttling at the same time as another processor.

* * * * *